(12) United States Patent
Yin et al.

(10) Patent No.: US 9,400,919 B2
(45) Date of Patent: *Jul. 26, 2016

(54) LEARNING DEEP FACE REPRESENTATION

(71) Applicant: Beijing Kuangshi Technology Co., Ltd., Beijing (CN)

(72) Inventors: Qi Yin, Beijing (CN); Zhimin Cao, Beijing (CN); Yuning Jiang, Beijing (CN); Haoqiang Fan, Beijing (CN)

(73) Assignee: Beijing Kuangshi Technology Co., Ltd., Beijing (CN)

( * ) Notice: Subject to any disclaimer, the term of this patent is extended or adjusted under 35 U.S.C. 154(b) by 23 days.

This patent is subject to a terminal disclaimer.

(21) Appl. No.: 14/375,679

(22) PCT Filed: May 27, 2014

(86) PCT No.: PCT/CN2014/078553
§ 371 (c)(1),
(2) Date: Jul. 30, 2014

(87) PCT Pub. No.: WO2015/180042
PCT Pub. Date: Dec. 3, 2015

(65) Prior Publication Data
US 2015/0347820 A1    Dec. 3, 2015

(51) Int. Cl.
*G06K 9/00* (2006.01)
*G06E 1/00* (2006.01)
*G06K 9/66* (2006.01)

(52) U.S. Cl.
CPC .............. *G06K 9/00221* (2013.01); *G06K 9/66* (2013.01)

(58) Field of Classification Search
CPC . G06K 9/00221; G06K 9/66; G06K 9/00228; G06K 9/00288; G06K 9/00281; G06K 9/00248
USPC ......... 382/100, 115, 118, 103, 224, 190, 161, 382/225, 159, 158, 187, 155, 154, 279, 156, 382/181, 276; 704/200, 232, 246, 273, 231; 706/2, 20, 15, 16
See application file for complete search history.

(56) References Cited

U.S. PATENT DOCUMENTS

| | | | |
|---|---|---|---|
| 5,774,129 A | 6/1998 | Poggio et al. |
| 6,038,337 A | 3/2000 | Lawrence et al. |
| 7,949,186 B2 | 5/2011 | Grauman et al. |
| 8,861,881 B2 | 10/2014 | Tate et al. |
| 8,873,813 B2 | 10/2014 | Tadayon et al. |
| 9,117,111 B2 | 8/2015 | Mori et al. |
| 9,129,148 B1 | 9/2015 | Li et al. |

*Primary Examiner* — Sheela C Chawan
(74) *Attorney, Agent, or Firm* — Fenwick & West LLP (57) ABSTRACT

Face representation is a crucial step of face recognition systems. An optimal face representation should be discriminative, robust, compact, and very easy to implement. While numerous hand-crafted and learning-based representations have been proposed, considerable room for improvement is still present. A very easy-to-implement deep learning framework for face representation is presented. The framework bases on pyramid convolutional neural network (CNN). The pyramid CNN adopts a greedy-filter-and-down-sample operation, which enables the training procedure to be very fast and computation efficient. In addition, the structure of Pyramid CNN can naturally incorporate feature sharing across multi-scale face representations, increasing the discriminative ability of resulting representation.

21 Claims, 6 Drawing Sheets

LEARNING DEEP FACE REPRESENTATION

FIELD OF THE INVENTION

This invention relates generally to image processing and, more particularly, to face recognition and representation of faces using machine learning.

DESCRIPTION OF THE RELATED ART

Face recognition systems perform image processing on digital images or video frames to automatically identify people. Face recognition systems typically represent face images as feature vectors of very large dimension. After obtaining the representation, various algorithms can be applied to perform the task of classification, verification and/or searching. Performance of the algorithms depends heavily on the choice of representation. Recently, there has been interest in designing better representations based on prior knowledge of face images.

Hand-crafted representations of very large dimension may provide high accuracy of face recognition results. However, to perform face recognition with hand-crafted representations, complicated multi-stage systems are carefully optimized separately for each module. The multi-stage system typically includes modules for pre-processing, low-level encoding, feature transformation and higher level representation, for example. The hand-crafted tuning of each individual module is labor-intensive. In addition, it is difficult to ensure the performance of the whole system by optimizing each module individually.

Thus, there is a need for better methods for learning representations of faces for face recognition and other purposes.

SUMMARY

The present invention overcomes the limitations of the prior art by employing a framework for learning face representations. In one approach, the framework is based on a structure of deep convolutional neural network with supervised learning signals for identification of pairs of face images. The deep convolutional neural network with supervised learning signals leads to an extraction of highly discriminative and compact representation of a face in a fast and computation-efficient manner for performing face recognition.

One aspect concerns training a pyramid convolutional neural network (CNN) for a face recognition system. The pyramid convolutional neural network (CNN) includes at least N shared layers where N≥2 and at least one unshared network is coupled to the Nth shared layer. The CNN levels are trained from 1 to N in that order. In one approach, CNN level n includes an input for receiving face images, the first n shared layers of the pyramid CNN, the unshared network of the pyramid CNN, and an output producing representations of the face images. The input is coupled to the first shared layer. Each shared layer includes convolution, non-linearity and down-sampling. In addition, the nth shared layer is coupled to the unshared network, and the unshared network is coupled to the output.

Preferably, training CNN level n includes presenting face images to the input. In one approach, each face image produces a corresponding representation at the output. The representations are processed to produce estimates of a metric, for which the actual values of the metric are known. The nth shared layer and the unshared network are adapted based on the estimates of the metric compared to the actual values of the metric. In one example, the pyramid CNN is trained on pairs of faces and the metric is whether the pairs are for the same person.

Other aspects include components, devices, systems, improvements, methods, processes, applications and other technologies related to the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A disclosed facial recognition system (and method) includes a deep convolutional neural network (herein referred to as "pyramid CNN," "CNN," or "multi-scale feature sharing network"). The pyramid CNN includes two or more levels, and trains (i.e., adapts) neural networks for each level. The network in the first level which has relatively small input size (e.g., 32×32 pixels) is first trained on part of the face. After training the first level network, its first layer is fixed and the fixed layer is used to train networks in the next level network. In training the second level, the first layer processes larger images (e.g., 48×48 pixels), and the second level network is trained on the processed images (e.g., 32×32 pixels for each image/feature) from the first layer. In this way, the input size of the network that is actually trained does not become larger as the level increases. This greedy layerwise training procedure continues until networks at all levels are trained, and the final network with N levels is obtained. By implementing more than one network in the same level, the lower level network's small coverage of the input region is compensated.

The pyramid CNN is a group of CNNs divided into multiple levels. The neural networks include two or more shared layers and at least an unshared network. Shared layers may be repeatedly used in the process of training in other levels, where an unshared network is used for training in a designated level. Each of the neural networks receives a portion of a face image, and weights of each of the neural networks are trained to perform filtering and down-sampling. The pyramid CNN extracts features from face images and outputs highly-compact representations after training of a large number of face images, according to supervised learning signals. The supervised learning signals impose an identification preserving requirement on the pyramid CNN.

A feature herein refers to a conspicuous characteristic of a face image. For example, the feature may be length, shape or size of a portion of a face (e.g., an eye, nose, mouth and etc.), or a distance between two portions of the face. Other examples of features include the person's gender, identity, and so on. Features typically are represented by a vector representation, with different elements or combinations of elements in the vector coding different characteristics of the face.

A face image herein refers to an image file (i.e., image pixels) that captures an entire face (or a portion of the face) of a subject.

Face Recognition Overview

Figure 1:
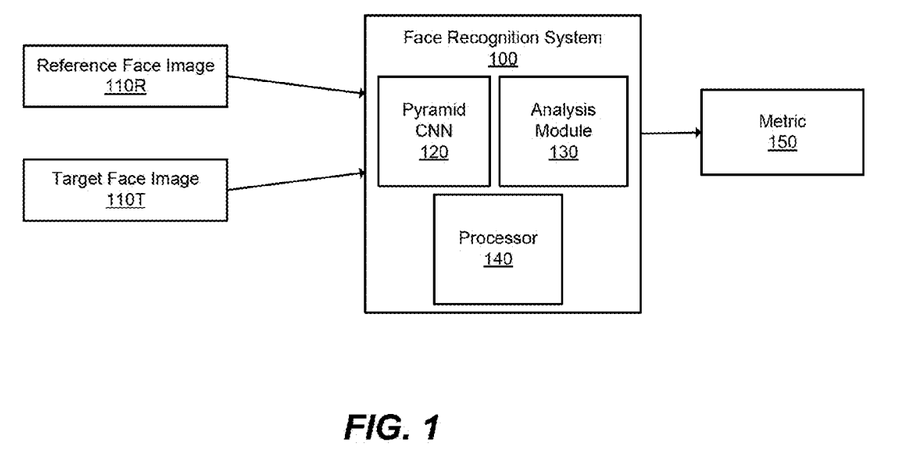
FIG. 1 is a simplified diagram of a face recognition system.

FIG. 1 is a simplified diagram of a face recognition system 100, according to one embodiment. The face recognition system 100 receives a target face image 110T and tries to recognize the face (i.e., associate the face with a specific individual). The face recognition system 100 also receives a reference face image 110R for a known individual. The face recognition system 100 performs analysis to generate a metric 150 to indicate whether the individual in the target face image 110T is the same as the individual in the reference face image 110R. The face recognition system 100 may have a large database of reference face images 110R for different individual and may compare the target face image 110T to many different reference face images 110R in order to identify the individual for the target face image 110T.

The face recognition system 100 includes pyramid CNN 120, an analysis module 130, and a processor 140. Each of these components may be embodied as hardware, software, firmware, or a combination thereof. Together, these components perform face recognition and determine whether the subjects in two face images 110 are identical or not.

The pyramid CNN 120 receives the face images 110 as inputs and generates a representation for each of the face images. Alternatively, the representations of the reference face images may be pre-computed. The representation of a face image preferably is obtained in an identity-preserving (ID-preserving) manner such that the distance in the mapped space closely reflects the semantic distance of identity of the face image to minimize the influence of irrelevant factors (e.g., illumination, expression, and pose). Moreover, the representation preferably encodes abstract and high level information of identity of the face image in a low dimensional space.

The analysis module 130 determines whether a subject in the reference face image 110R and a subject in the target face image 110T match. The analysis module 130 obtains the representations of the face images 110 at an output of the pyramid CNN 120. Further, the analysis module 130 generates metric 150 on whether the face images 110 belong to the same subject (person) based on the representations of the face images 110. The metric 150 can be used to perform face recognition. Typical metrics are based on computing the cosine angle between the two vector representations, or computing the Euclidean (or other) distances between the two representations.

The processor 140 executes instructions to perform face recognition on the face recognition system 100. The processor 140 receives instructions from memory (not shown), or external circuitry. The instructions may also reside, completely or at least partially, within the processor 140 (e.g., within a processor's cache memory). According to the instructions, the processor 140 transforms or selects a portion of the face images 110 to provide to the pyramid CNN 120. In addition, the processor 140 operates the pyramid CNN 120 and the analysis module 130 according to the instructions to perform core functions of the face recognition.

Face Representation

The pyramid CNN 120 is trained according to supervised learning signals to obtain a concise and distinctive representation. Detailed operations of the pyramid CNN 120 are described hereafter with respect to FIG. 2.

The representation produced by the pyramid CNN can be expressed as a function map from image pixel to numeric vector.

$$f: R^{h \times w} \to B^m \quad (1)$$

In training the pyramid CNN 120, the desired representation is learned from a training set of pairs of face images 110. This involves parameterizing a function family and using an object function L to choose the representation extractor:

$$\theta_0 = \underset{\theta}{\operatorname{argmin}} \, L(f_\theta, I_{data}) \quad (2)$$

where $f_\theta$ is the function implemented by the pyramid CNN when using weights $\theta$, $1_{data}$ is the training set, $L(\ )$ is an object function, and $\theta_0$ are the weights that optimize the object function L. The underlying function family $f$ should contain enough complexity to express the complex and high-level computation required. To enforce the ID-preserving property, identity information should be used in the objective function L. This leads to a supervised representation learning method which is in contrast to the unsupervised methods that aim at modeling the density distribution of data points. Though unsupervised methods are capable of discovering the patterns emerged in data, their optimization target is not directly related to the recognition task, so the learned representation obtained by the unsupervised method is inevitably susceptible to factors including illumination, expression and pose. In contrast, the supervised method explicitly imposes the ID-preserving requirement. Therefore, the learning representation obtained by the supervised method is immune to illumination, expression and pose.

In one embodiment, the supervised signal in face recognition labels face image pairs with an indication of whether they belong to the same person. One output neural network uses a distance function to compare the representations of pairs of face images and predicts whether the face image pair belongs to the same person. An example loss function is $$L = \sum_{I_1, I_2} \log(1 + \exp(\delta(I_1, I_2) D(I_1, I_2))) \quad (3)$$

$$D(I_1, I_2) = \alpha \cdot d(f_\theta(I_1), f_\theta(I_2)) - \beta \quad (4)$$

where $\delta(I_1, I_2)$ is a metric that indicates whether the two face images $I_1$ and $I_2$ of a pair belong to the same person. $f_\theta$ represents the computation done by the neural network to transform the face image to a representation, and d is a function to measure the distance between the representation vectors for the two face images. $\theta$ are the weights in the network, which are trained. $\alpha$ and $\beta$ are additional trainable parameters.

This loss function encourages small distances between features belonging to the same person (or subject) and penalizes similarity between unmatched pairs. Hence, a distance between the representations of the two face images in a pair is used as a metric to determine whether two face images of each pair are for the same person. When the two face images 110 are for the same person, the distance should be lower. When the two face images 110 are not for the same person, the distance should be higher. In this way, the learned feature manifests good ID-preserving property, and it is highly specific to the recognition task. Factors corresponding to intra-person variation will be suppressed by the network.

Pyramid Convolutional Neural Network (Pyramid CNN)

Figure 2:
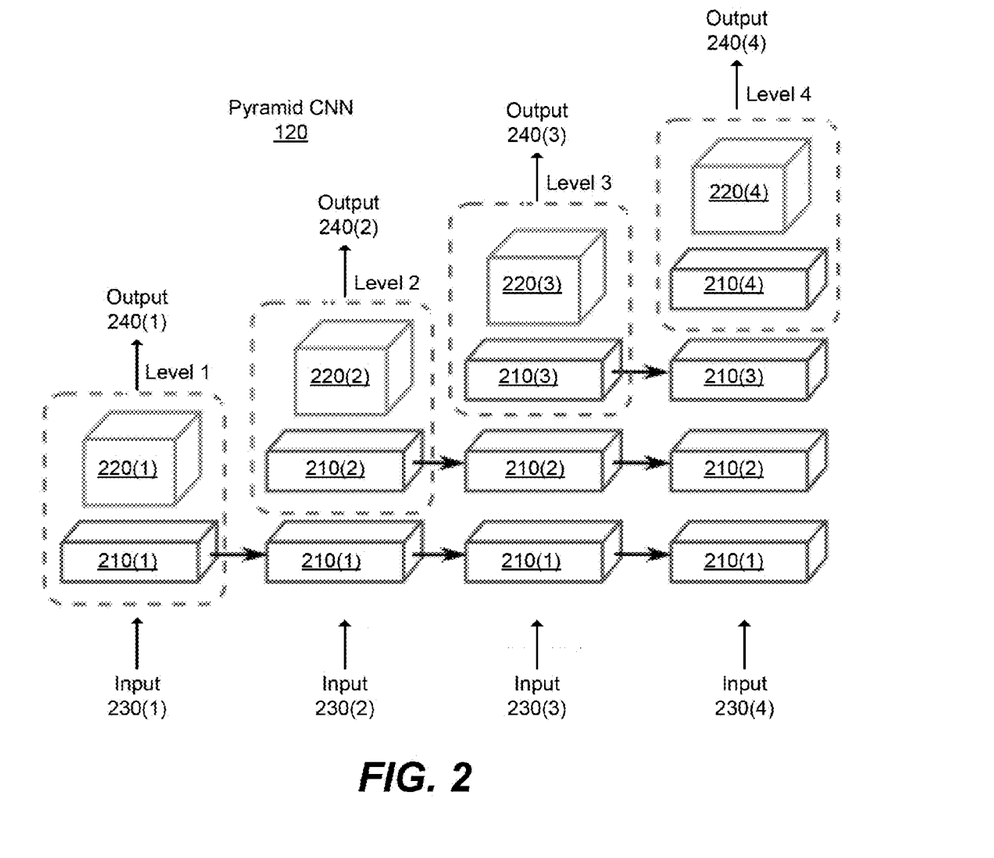
FIG. 2 is a diagram of a process of training a pyramid convolutional neural network (CNN).

FIG. 2 is a diagram of a process of training the pyramid CNN 120, according to one embodiment. The pyramid CNN 120 may directly receive face images (or portions of face images) 110 without any processing. Alternatively, the pyramid CNN 120 may receive processed face images (or portions of face images) 110. The pyramid CNN 120 includes N levels of convolutional neural networks. In this example, N=4 and the different CNN levels are labeled "Level 1" to "Level 4." Each neural network performs convolution, non-linearity and down-sampling. Different CNN levels typically have different depth and input size, and the different CNN levels also share layers (labeled 210 in FIG. 2). The pyramid CNN 120 generates a representation of each of the face images 110, and adapts neural networks based on the representation of each of face images 110.

The pyramid CNN 120 includes N shared layers 210 where N≥2 and at least one unshared network 220 coupled to the Nth shared layer. The pyramid CNN 120 includes N number of CNN levels. Each CNN level n (n=1 to N) includes an input, n of the shared layers, an unshared network, and an output.

For example, the pyramid CNN 120 illustrated in FIG. 2 includes four levels. Thus, the pyramid CNN 120 in this example includes four shared layers 210(1), 210(2), 210(3), and 210(4), unshared networks 220(1), 220(2), 220(3), and 220(4), inputs 230(1), 230(2), 230(3), and 230(4), and outputs 240(1), 240(2), 240(3), and 240(4).

CNN Level 1 includes only a single shared layer 210(1). The input 230(1) is coupled to the first shared layer 210(1), which is coupled to the unshared network 220(1), which is coupled to the output 240(1). In contrast, CNN Level 4 includes four shared layers 210(1)-(4). The input 230(4) is coupled to the first shared layer 210(1), which is coupled eventually to the last shared layer 210(4), which is coupled to the unshared network 220(4), which is coupled to the output 240(4). In general, for CNN Level n, the input 230(n) is coupled to the first shared layer 210(1), which is coupled eventually to the nth shared layer 210(n), which is coupled to the unshared network 220(n), which is coupled to the output 240(n). Note that shared layer 210(1) has the same structure and weights for all CNN Levels, as is true for each of the shared layers 210(n). The unshared networks 220 have the same structure for all CNN Levels but may have different weights for each CNN Level.

In operation (i.e., when not training), face images are input to input 230(4), processed by shared layers 210(1)-(4) and unshared network 220(4), and the last layer output 240(4) produces the representation of the face image.

In one embodiment, the pyramid CNN 120 is trained in a supervised greedy manner. As illustrated in FIG. 2, the dashed outline indicates which layers are trained at which CNN Level. The shared layer 210(1) and the unshared network 220(1) are trained together for CNN Level 1. The shared layer 210(2) and the unshared network 220(2) are trained together for CNN Level 2. Shared layer 210(1) is not trained for CNN Level 2. Rather, it takes the weights resulting from the training for CNN Level 1.

Each shared layer 210 includes convolution, down-sampling and non-linearity. Assume that CNN Level 1 is trained on 32×32 face images and further assume that each shared layer 210 includes a 2× down-sampling. This means that, CNN Level 1 receives 32×32 face images and the shared layer 210(1) is trained based on incoming 32×32 images. However, CNN Level 2 receives 64×64 face images, but the shared layer 210(2) is trained based on incoming 32×32 images/features generated by shared layer 210(1) due to the down-sampling. That is, the shared layer 210(2) and the unshared network 220(2) are trained together on the processed images/features from the first shared layer 210(1). And so on for other CNN Levels and shared layers. In this way, the size of the images/features used to train each shared layer 210(n) does not become prohibitively large as the total number of shared layers increases. The inputs to each CNN Level can be taken from the same set of images. For example, 32×32 clips can be used as inputs to CNN Level 1, 64×64 clips as inputs to CNN Level 2, and so on.

For each increasing CNN Level n, similar steps are performed, where the first (n-1) shared layers 210(1) . . . 210(n-1) are fixed. The nth shared layer 210(n) and the nth unshared network 220(n) are trained together based on the processed images/features from the cascade of shared layers 210(1) . . . 210(n-1). For example, in level 3, the shared layers 210(1), and 210(2) are not adapted, and the shared layer 210(3) and the unshared network 220(3) are trained together. Similarly, in level 4, the shared layers 210(1), 210(2), and 210(3) are not adapted, and the shared layer 210(4) and the unshared network 220(4) are trained together. In one embodiment, the size of the input 230(n) to CNN Level n increases as n increases from 1 to N, according to the down-sampling from the shared layers 210(1) . . . , 210(n-1). Therefore, a size of the images/features input to the nth shared layer 210 is approximately constant for n=1 to N.

Table 1 shows one approach in supervised training of the pyramid CNN, as explained with respect to FIG. 2.

---

Algorithm 1 Supervised Greedy Training of the Pyramid CNN.

Input: the image data $i_{data}$
for i from 0 to $i_{max}$ do
    set $I_{train}$ to patches cropped from $I_{data}$
    let the CNN be $f_\theta(x) = f_{\theta}'(f_0^i(x))$, where $f^i$ is the first layer's computation.
    find $\theta$ by minimizing the objective (1) with $I_{data}$
    process the image data $I_{data} \leftarrow f_\theta^1 (I_{data})$
end for

---

Figure 3:
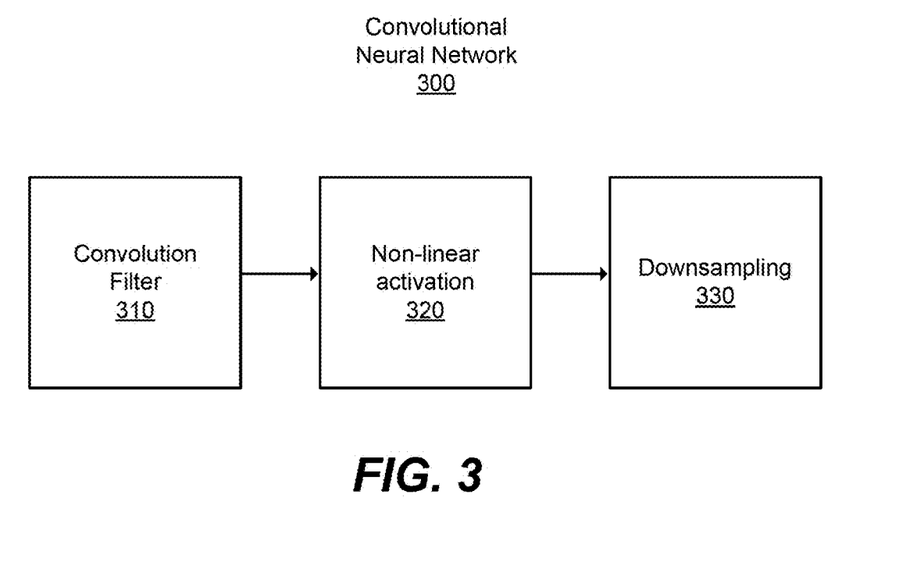
FIG. 3 is a detailed diagram of a convolutional neural network.

FIG. 3 illustrates one embodiment of a convolutional neural network layer 300. The convolutional neural network layer 300 may be used for the shared layers 210 and/or for the unshared networks 220. The convolutional neural network 300 includes a convolution filter 310, a non-linear activation operator 320, and a down-sampling operator 330.

The convolutional neural network layer 300 is a highly non-linear real valued multivariate function which is composed of the convolution filter 310, the non-linear activation operator 320 and the down-sampling operator 330:

$$I^{i+1} = P_{max}(g(I^i \otimes W^i + B^i)) \quad (5)$$

where $I^i$ is the neuron's value in the ith layer. The convolution filter 310 can be defined as:

$$(I^i \otimes W^i)_{x,y,z} = \sum_{a,b,c,z} I^i_{x-a,y-b,c} W^i_{a,b,c,z} \quad (6)$$

where W are the weights of the convolution filter and B (in Eqn. (5)) is a convolution filter bias. Both W and B are adapted during training. The non-linear activation operator 320 is represented by the non-linear function g. Examples of function g include the hyper-tangent function, rectified-linear function, sigmoid function, etc. The down-sampling can be defined as the max-pooling operator $$P_{max}(I^i)x, y = \max_{0 \leq a,b < s} I^i_{xs+a,ys+b} \quad (7)$$

Gradient based algorithms are developed to estimate the weights in the convolutional neural network layer 300. Hence, adapting (i.e., training) the pyramid CNN (e.g., shared layer 210, the unshared network 220 or the combination thereof) includes adapting convolution filter weights for convolution filters 310. By using shared weights, the same convolution filter 310 is used for each pixel in the layer. Thus, memory size to perform convolution is reduced and computation speed is improved.

Beneficially, the face recognition system 100 using the pyramid CNN 120 with supervised learning signals achieves extraction of highly discriminative and compact representation of a face in a fast and computation-efficient manner for performing face recognition. By employing a strongly supervised pyramid CNN 120, the learning signals at all levels directly reflect the final task. Thus, it is guaranteed that the shared layers 210 learn to extract discriminative information closely related to the task.

Another interpretation of the Pyramid CNN 120 is a multi-scale feature extraction architecture. The pyramid preferably can naturally handle multi-scale input patch which is common in face recognition. The image patches of different sizes are fed to networks at corresponding scale level. The pyramid takes advantage of the multi-scale structure by using deeper networks for larger input region. The increase in depth allows higher level networks to undertake more complex and abstract computation on larger image patches.

In an alternative embodiment, more than one unshared network 220 exists in the same level, and they work on different regions while sharing their first layer parameters. Hence, the pyramid CNN 120 further includes two or more unshared networks 220 coupled to the Nth shared layer 210 (N).

Certain implementations of pyramid CNNs may have some or all of the following characteristics. The input image sizes to CNN Level N typically are in the range of 80×80 to 400×400. The pyramid CNN typically may have from 1 to 4 shared layers 210, and the downsampling is preferably in the range of 1.2 to 1.5 between layers and preferably less than 2×. The pyramid CNN may also have anywhere from 10 to 100 unshared networks 220. The box 220 in FIG. 2 represents all of these unshared networks. Typical convolution kernels may range in size from 3×3 to 7×7. There may be anywhere from 1,000 to 1 million weights per shared layer. For pyramid CNNs of these sizes, the training set typically varies in size from between 500 thousand to 10 million images. These numbers are merely representative. Designs are not required to adhere to these numbers.

Operation of Face Recognition

Figure 4:
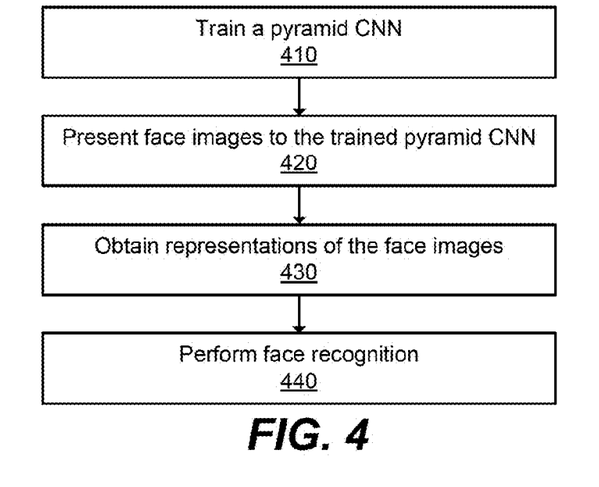
FIG. 4 is a flow diagram of a method of performing face recognition.

FIG. 4 illustrates a flow diagram of a method of performing face recognition using the face recognition system 100, according to one embodiment. The face recognition system 100 employs a pyramid CNN 120 for generating representations of face images. The pyramid CNN 120 is trained 410 with pairs of face images 110. After training is completed, target face images 110 are presented 420 to an input of the pyramid CNN 120 and representations of the face images 110 are obtained 430 at an output of the pyramid CNN 120. Face recognition is then performed 440 using these representations of the face images 110. For example, distances between representations can be used to determine whether two face images are for the same person.

Figure 5:
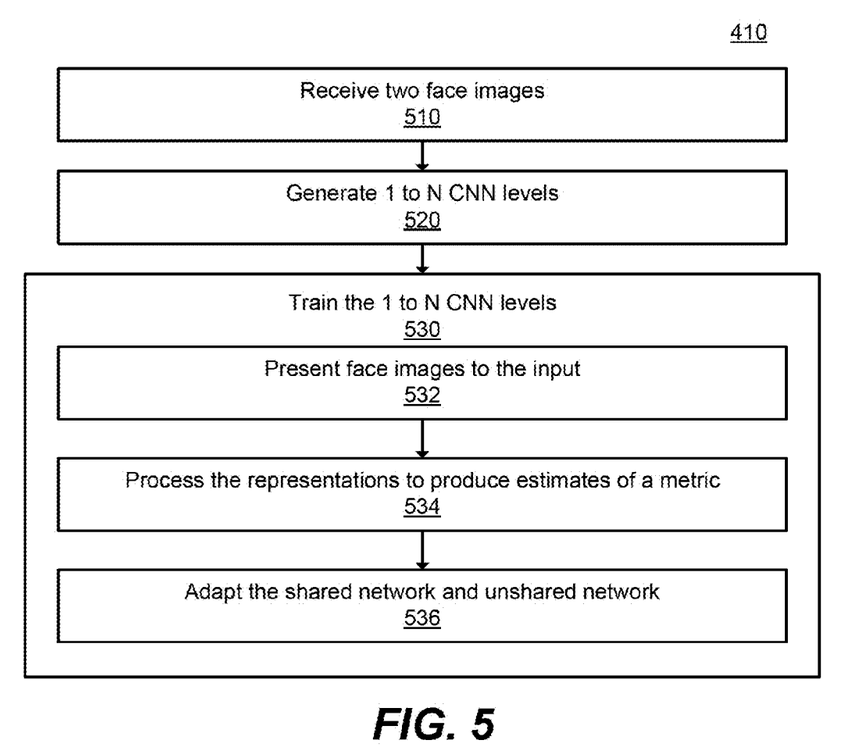
FIG. 5 is a flow diagram of a method of training the pyramid CNN.

FIG. 5 is a flow diagram of a method of training 410 the pyramid CNN 120. The pyramid CNN 120 receives 510 pairs of face images 110. The pyramid CNN 120 generates 520 to N CNN levels. CNN level n includes an input for receiving face images 110, the first n shared layers 210, the unshared network 220, and an output 240 for producing representations of the face images. The input is coupled to the first shared layer 210(1), and the nth shared layer 210(n) is coupled to the unshared network 220. Further, the unshared network 220 is coupled to the output 240. The CNN levels are trained 530 from level 1 to level N in that order. That is, CNN level 1 is trained first, and then CNN level 2, and so on to CNN level N.

For training CNN level n, the CNN level n is presented 532 with face images 110 to the input 230 of the CNN level n. Each face image 110 produces a corresponding representation at the output 240. In one approach, pairs of face images 110 are presented to the input 230(n) of the CNN level n. In addition, the representations are processed 534 to produce estimates of a metric 150. For example, the metric 150 is whether the two face images 110 of each pair are for the same person. The metric 150 can also be a distance between the representations of the two face images 110 in the pair. The actual values of the metric are known. Furthermore, the nth shared layer 210(n) and the unshared network 220(n) are adapted based on the estimates of the metric 150 compared to the actual values of the metric 150. Adapting the nth shared layer 210(n) and the unshared network 220(n) may be based on decreasing the distance when the two face images 110 are for the same person, and increasing the distance when the two face images are not for the same person.

Simulation Results

Labeled faces in the wild (LFW) is a challenging benchmark for face recognition systems. It contains more than 13,000 pictures acquired from the web. The experiment protocol is to evaluate the accuracy of verifying whether the two images belong to the same person. The results of face recognition using the pyramid CNN are compared with results of face recognition using other methods.

Figure 6:
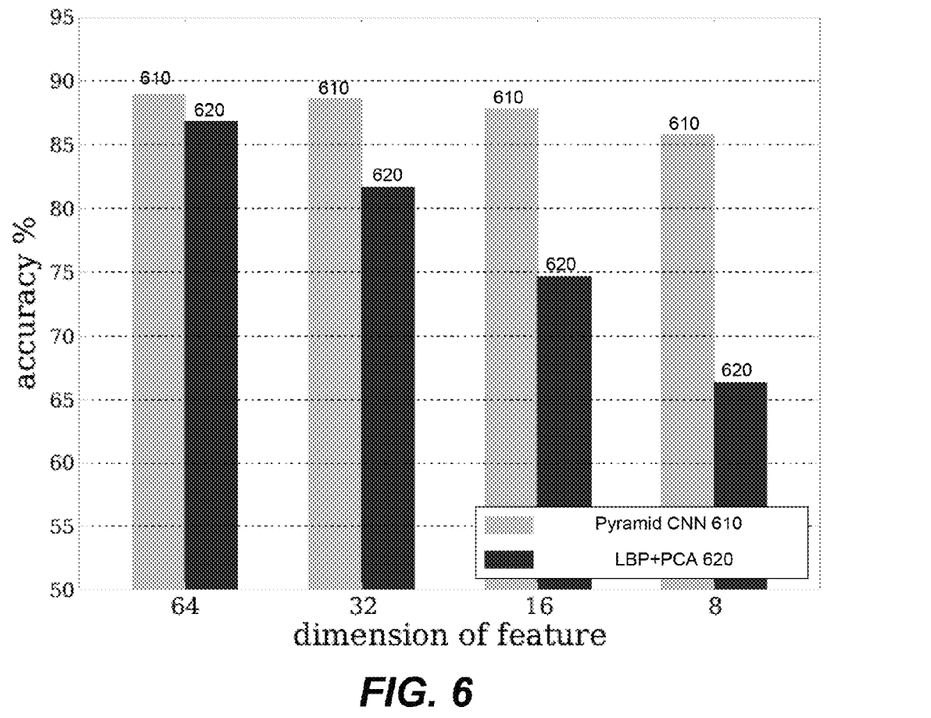
FIG. 6 is a histogram for comparing the performances of face recognition using the pyramid CNN and a landmark based position.

FIG. 6 is a histogram for comparing the performances of face recognitions using the pyramid CNN 120 and a landmark based position (LBP). The histogram in FIG. 6 has two plots. The left plot 610 in each pair are the accuracy results of the pyramid CNN 120. The right plot 620 in each pair are the accuracy results of the Pyramid CNN 120 extended to the landmark based multi-scale feature extraction scheme. The pyramids are built on different landmark positions, and the outputs at all levels of the pyramids are concatenated to increase the dimension of the representation.

For the comparison, face recognition using a four level Pyramid CNN 120 is performed on the whole face image. The output of the last level network is taken as the representation of the image, and other levels are only constructed for training. The representation is learned on an outside face album containing the photos of thousands of people, and it is tested on the LFW benchmark.

FIG. 6 shows the accuracy of this feature at low number of dimensions. The LBP baseline has an accuracy of 96.3% when its dimension is above 1000. See Chen, D., Cao, X., Wen, F., Sun, J.: Blessing of dimensionality: High-dimensional feature and its efficient compression for face verification. In: Computer Vision and Pattern Recognition (CVPR), 2013 IEEE Conference on, IEEE (2013) 3025-3032. However, its performance is poor in the low dimensional setting. As illustrated, the performance of the pyramid CNN 120 drops slowly when the dimension is reduced and the pyramid CNN 120 still achieves high recognition accuracy (85.8% on LFW benchmark) with only 8 dimension representation. In contrast, the LBP baseline achieves only 66% accuracy when reduced to 8 dimensions. Hence, face recognition using the pyramid CNN 120 can achieve high accuracy with a compact feature dimension. Traditional approaches typically use face representations that are larger than 1K bytes, while the pyramid CNN can maintain good face discrimination using face representations of 4 to 64 bytes and preferably not more than 64 dimensions.

Figure 7:
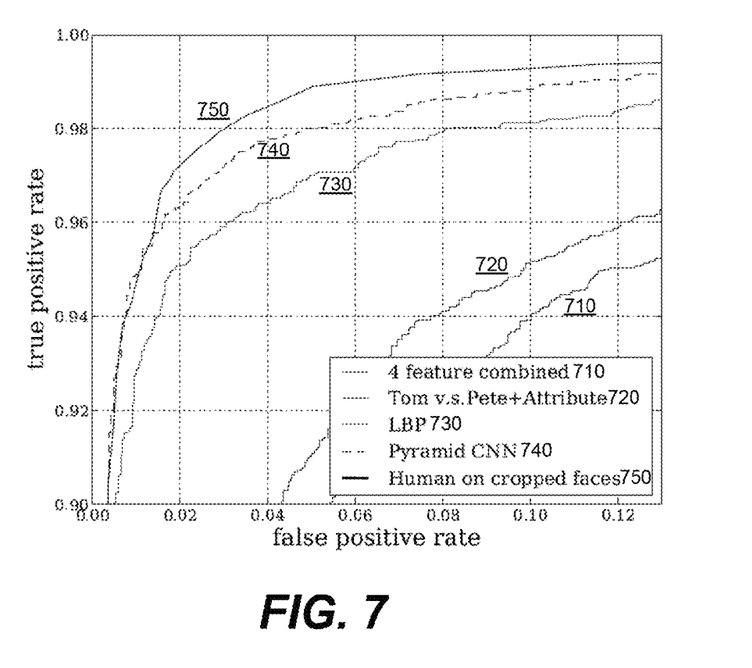
FIG. 7 is a performance on a labeled faces in the wild (LFW) benchmark when there is no constraint on the length of the representation.

FIG. 7 is a performance on a labeled faces in the wild (LFW) benchmark when there is no constraint on the length of the representation. The panel in FIG. 7 includes five plots. The lower right-most plot 710 is a result of face recognition using a 4 feature combined method. This method combines four non-deep-learning traditional features in face recognition, as described in Chen, D., Cao, X., Wang, L., Wen, F., Sun, J.: Bayesian face revisited: A joint formulation. In: Computer Vision—ECCV 2012. Springer (2012) 566-579. The next plot 720 is a result of face recognition using Tom vs. Pete+Attribute, as described in Berg, T., Belhumeur, P. N.: Tom-vs-pete classifiers and identity-preserving alignment for face verification. In: BMVC. Volume 1. (2012) 5. Plot 730 is a result of face recognition using LBP. See Chen, D., Cao, X., Wen, F., Sun, J.: Blessing of dimensionality: High-dimensional feature and its efficient compression for face verification. In: Computer Vision and Pattern Recognition (CVPR), 2013 IEEE Conference on, IEEE (2013) 3025-3032. The plot 740 is a result of face recognition using the pyramid CNN 120. Lastly, the black line 750 is result of human on cropped faces.

As shown in FIG. 7, face recognition using the pyramid CNN 120 achieves state-of-the-art performance on the LFW benchmark. The Pyramid CNN 120 with extended feature sharing achieves the state-of-the-art performance (97.3%) on LFW bench mark. Furthermore, the accuracy is very close to human's performance when the face is cropped by a bounding box.

Figure 8:
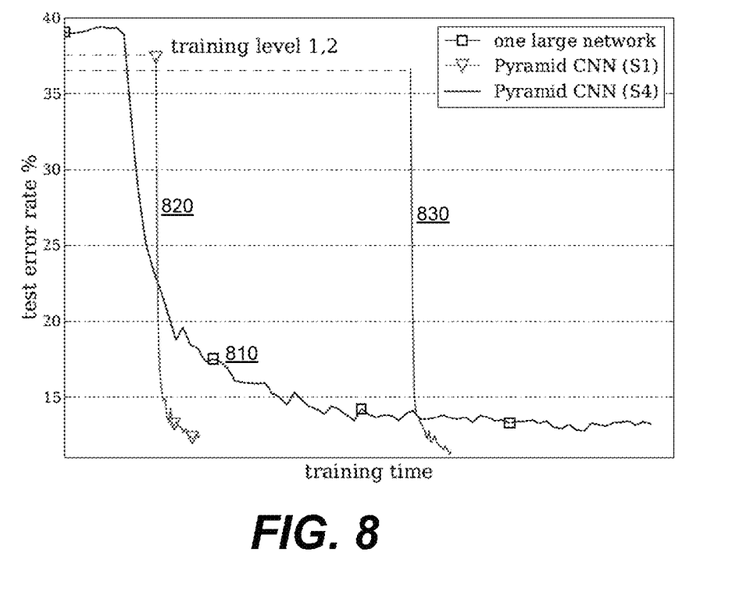
FIG. 8 illustrates the test accuracy at different time points in training neural network depending on a number of the neural networks.

FIG. 8 illustrates the test accuracy at different time points in training depending on the number of networks. FIG. 8 illustrates effects of the layer sharing mechanism in the pyramid CNN 120. The panel in FIG. 8 includes three plots. Plot 810 is a result of one large network. Plot 820 is a result of a pyramid CNN 120 with one network in the same scale level. Plot 830 is a result of a pyramid CNN 120 with four networks in the same scale level.

Given the same amount of time, networks trained by pyramid CNN 120 achieve significantly better results. Also, using more networks in one scale level in the pyramid improves performance. Training multiple networks in the lower scale levels also improves performance at the expense of moderate slow down.

Although the detailed description contains many specifics, these should not be construed as limiting the scope of the invention but merely as illustrating different examples and aspects of the invention. It should be appreciated that the scope of the invention includes other embodiments not discussed in detail above. For example, the principles disclosed in the pyramid CNN 120 can also be applied to other areas or objects besides face recognition and representation. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A computer-implemented method for training a pyramid convolutional neural network (CNN) comprising at least N shared layers where N≥2 and at least one unshared network coupled to the Nth shared layer, the method comprising:
training CNN levels 1 to N in that order, wherein CNN level n comprises an input for receiving face images, the first n shared layers of the pyramid CNN, the unshared network of the pyramid CNN, and an output producing representations of the face images; wherein the input is coupled to a first of the n shared layers; each shared layer includes convolution, non-linearity and down-sampling;

an nth of the n shared layers is coupled to the unshared network; and the unshared network is coupled to the output;
wherein training CNN level n comprises:
presenting face images to the input, each face image producing a corresponding representation at the output;
processing the representations to produce estimates of a metric, for which actual values of the metric are known; and
adapting the nth shared layer and the unshared network based on the estimates of the metric compared to the actual values of the metric.

2. The computer-implemented method of claim 1 wherein:
presenting face images to the input comprises presenting pairs of face images to the input, where it is known whether the two faces images in each pair are for a same person;
the metric is whether the two face images of each pair are for a same person; and
adapting comprises adapting the nth shared layer and the unshared network based on the estimated metric of whether two face images of each pair are for a same person compared to the known value of whether the two face images are actually for the same person.

3. The computer-implemented method of claim 2 wherein the metric is a distance between the representations of the two face images in a pair.

4. The computer-implemented method of claim 3 wherein adapting comprises adapting the nth shared layer and the unshared network based on decreasing the distance when the two face images are for the same person and increasing the distance when the two face images are not for the same person.

5. The computer-implemented method of claim 1 wherein training CNN level n further comprises not adapting the first (n−1) shared layers.

6. The computer-implemented method of claim 1 wherein, in training CNN level n, a size of the inputs to the nth shared layer is approximately constant for n=1 to N.

7. The computer-implemented method of claim 1 wherein, in training CNN level n, a size of the input to the 1st shared layer increases as n increases from 1 to N.

8. The computer-implemented method of claim 7 wherein, in training CNN level n, the faces images used as input to the 1st shared layer are clipped from a common set of face images but constitute larger clips of the face images as n increases from 1 to N.

9. The computer-implemented method of claim 1 wherein adapting the nth shared layer comprises adapting convolution filter weights for convolution filters used in convolution within the nth shared layer.

10. The computer-implemented method of claim 1 wherein, for all shared layers, sub-sampling is not more than 2× down-sampling.

11. The computer-implemented method of claim 1 wherein the representation of the face image is not more than 8 dimensions.

12. The computer-implemented method of claim 1 wherein the representation of the face image is not more than 64 bytes.

13. The computer-implemented method of claim 1 wherein the trained pyramid CNN is more than 97% accurate on an LFW benchmark (labeled faces wild).

14. The computer-implemented method of claim 1 wherein the pyramid CNN further comprises two or more unshared networks coupled to the Nth shared layer.

15. The computer-implemented method of claim 14 wherein the pyramid CNN comprises at least 100 unshared networks coupled to the Nth shared layer.

16. The computer-implemented method of claim 1 wherein N is less than 5.

17. The computer-implemented method of claim 1 wherein the downsampling is less than 2×.

18. The computer-implemented method of claim 1 wherein each shared layer contains between 1,000 and 1 million weights to be adapted.

19. A method for processing a face image, the method comprising:
presenting the face image to an input of a pyramid CNN, the pyramid CNN trained according to The computer-implemented method of claim 1; and
obtaining a representation of the face image at an output of the pyramid CNN.

20. The computer-implemented method of claim 19 further comprising:
using the representation of the face image to perform face recognition.

21. A non-transitory computer readable medium configured to store program code, the program code comprising instructions for training a pyramid convolutional neural network (CNN) comprising at least N shared layers where N≥2 and at least one unshared network coupled to the Nth shared layer, the instructions when executed by a processor cause the processor to:
training CNN levels 1 to N in that order, wherein CNN level n comprises an input for receiving face images, the first n shared layers of the pyramid CNN, the unshared network of the pyramid CNN, and an output producing representations of the face images; wherein the input is coupled to a first of the n shared layers; each shared layer includes convolution, non-linearity and sub-sampling; an nth of the n shared layers is coupled to the unshared network; and the unshared network is coupled to the output;
wherein training CNN level n comprises:
presenting face images to the input, each face image producing a corresponding representation at the output;
processing the representations to produce estimates of a metric, for which actual values of the metric are known; and
adapting the nth shared layer and the unshared network based on the estimates of the metric compared to the actual values of the metric.

\* \* \* \* \*